Oct. 13, 1936.  D. E. JOHNSON  2,057,527
METHOD OF AND APPARATUS FOR MAKING NUTS
Filed June 5, 1935
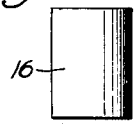
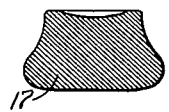
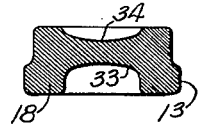
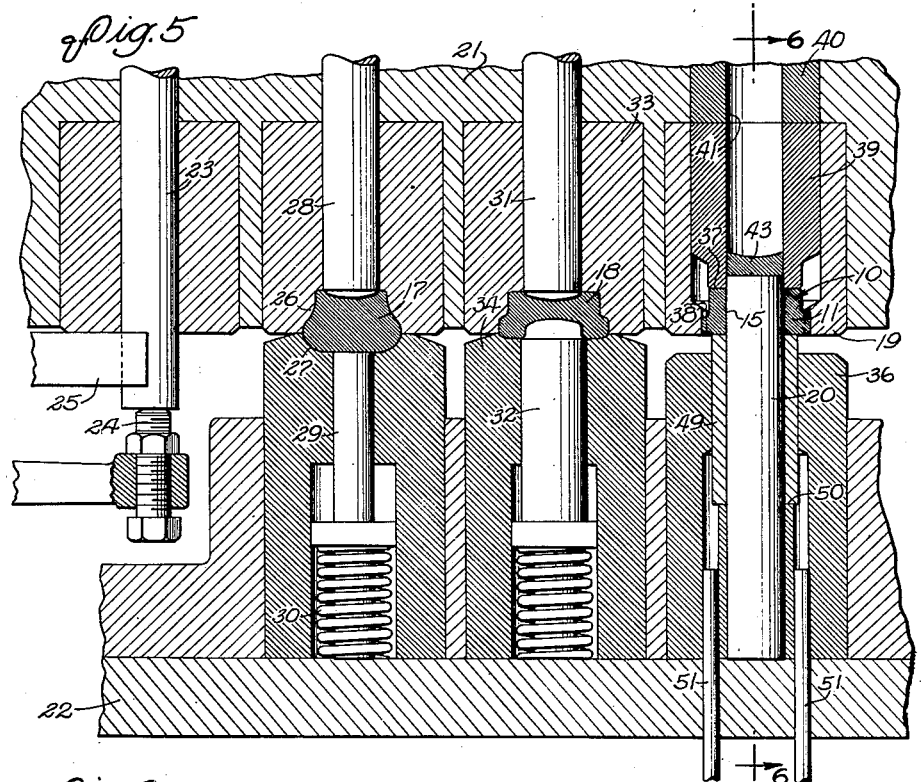
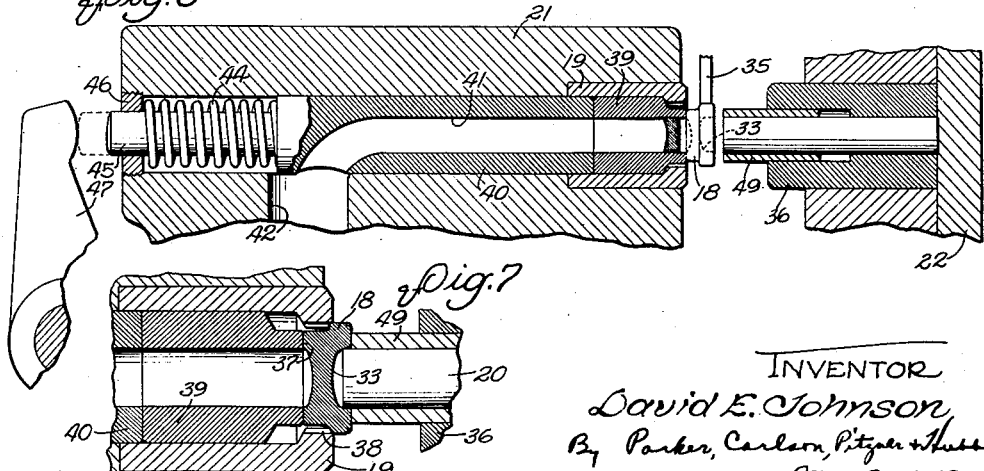
INVENTOR
David E. Johnson,
By Parker, Carlson, Pitzner & Hubbard
ATTORNEYS Patented Oct. 13, 1936

2,057,527

UNITED STATES PATENT OFFICE 2,057,527

METHOD OF AND APPARATUS FOR MAKING NUTS

David E. Johnson, Rockford, Ill.

Application June 5, 1935, Serial No. 25,012

12 Claims. (Cl. 10—86)

This invention relates to the forging of nuts from wire stock and more particularly to the manufacture of nuts of the type having fine peripheral serrations by which the nut may be gripped and turned onto a bolt or screw part.

The general object is to provide a novel method of and apparatus by which nuts of the above character may be formed accurately and at low cost. In carrying out this object, the invention contemplates forging a piece of wire into the shape of the nut desired and cutting longitudinal serrations and piercing the blank at its center in a single continuous operation.

The invention also resides in the novel structural character of the mechanism by which the combined piercing and serrating operation is performed.

Other objects and advantages of the invention will become apparent from the following detailed description taken in connection with the accompanying drawing, in which Figures 1, 2, 3 and 4 are elevational and sectional views illustrating successive steps in the formation of the nut blanks.

Fig. 5 is a fragmentary horizontal sectional view of the supporting and forming dies in a machine for carrying out the present invention.

Fig. 6 is a section taken along the line 6—6 of Fig. 5.

Fig. 7 is a fragmentary section view similar to Fig. 5 showing the serrating and piercing parts in a different position.

In the drawing, the invention is illustrated in connection with the formation of blanks 10 for nuts of the so-called fillister type comprising a body 11 having a smooth head portion 12 upstanding from an enlarged base 13 formed with fine longitudinal serrations or teeth 14 preferably having flat intersecting side surfaces. The blank thus shaped is pierced at its center to define a cylindrical recess 15 which is later tapped to form the completed nut.

The invention contemplates the formation of the nut blanks 10 by forging, trimming and piercing operations all performed upon a piece 16 of wire stock as the latter is transferred through successive operating positions in a single machine. In the present instance, shaping of the work piece is effected in two steps to form intermediate shapes 17 and 18 and the piercing and serrating operations are performed in a continuous relative axial movement between a serrating die 19 and a piercing tool 20.

The exemplary machine shown in the drawing for performing the different operations is of the type commonly used in the formation of headed machine parts and comprises generally a stationary die block 21 and a movable head 22 reciprocated by a crank or other suitable power driven mechanism (not shown) toward and away from the block to bring pairs of dies into positions for performing the different operations upon work pieces disposed in the respective operating positions. Advance of the work pieces through the successive operating positions is effected by transfer mechanism (not shown) adapted to grip the work pieces in the different positions and shift each one to the next succeeding position while the head 22 is retracted.

The wire 23 from which the blanks are cut is advanced in timed relation to the movement of the head 22 against a stop 24 and the projecting end is sheared off by a cutter 25. The blank thus formed is first transferred into alinement with stationary and movable dies 26 and 27 which in the next forward stroke of the head 22 flatten the piece axially and force the same into the shape shown in Fig. 2. As the head is retracted, the work piece 17 is ejected from the die 26 by timed operation of an ejector 28 which cooperates with a plunger 29 urged forwardly by a spring 30 to support the piece until it is engaged by the transfer mechanism.

In the next position, the work piece is similarly supported by an ejector pin 31 and a plunger 32 and forged by coaction of dies 33 and 34 in the advance of the head 22 into the shape shown in Fig. 3. The work piece now has the external contour desired in the final nut and is formed by the projecting ends of the pin 31 and the plunger 32 with circular depressions 33 and 34 corresponding to the shape of the central recess to be formed.

In the succeeding active movement of the transfer mechanism, the work piece is gripped by fingers 35 of the transfer mechanism and shifted laterally into position shown in Fig. 6 between a bushing 36 in the head 22 and the die 19. The die 19 is sleeve-like in form having an internal bore with inturned flange at its end formed with V-shaped serrations 38 complemental to the serrations 14 to be cut on the blank. Slidable within the bore of the die 19 is a hollow plunger 39 providing an abutment 37 by which the relative movement between the blank and the die and tool is controlled. The diameter of the forward end of the plunger is such that it may move through the serrations 38 to a position (Fig. 6) flush with the face of the die 19. The rear end of the plunger abuts against and is alined with a sleeve 40 the bore 41 of which bends as shown in Fig. 6 into communication with a passage 42 through which the punched out slugs 43 may be forced. The sleeve 40 is urged forwardly by a spring 44 coiled around a pin 45 rigid with the rear end of the sleeve and acting between the sleeve and a threaded bushing 46. Retraction of the abutment 37 is controlled in timed relation to the movements of the head 22 by an arm 47 actuated by a suitable cam means (not shown).

Slidable within the bushing 36 is a sleeve 49 having one end projecting from the bushing and abutting at its rear end against a shoulder 50 of smaller diameter rigid with the head 22. As the head is retracted, the sleeve 49 engages stationary pins 51 and is thereby projected from the bushing to the position shown in Fig. 6. The piercing tool 20 is in the form of a rod supported in the sleeve 49 with its rear end abutting against the head 22 and its forward end projecting a substantial distance beyond the face of the bushing 36.

While the head 22 is retracted, a work piece 18 will be transferred laterally in between the piercing tool and the abutment 37 which will then be projected forwardly by the spring 44 to a position substantially flush with the face of the die 19 as shown in Fig. 6. As the head advances, the tool 20 will enter the depression 33 and center the work piece as it is forced against the abutment 37. In the continued forward movement of the head, the tool 20, acting through the medium of the blank 18, pushes the abutment rearwardly against the action of the spring 44, the portion 12 of the work piece entering the die as shown in Fig. 7 and the base portion 13 of the blank finally engaging the die serrations 30 which cut complemental serrations on the blank as the tool advances.

After the blank has been advanced fully into the die, the plunger pin 45 encounters the arm 47 thereby arresting the movement of the blank relative to the die 19 whereupon continued advance of the head 22 projects the tool 20 on through the blank thus punching out the central portion thereof to leave true cylindrical recess. The slug 43 which is formed is forced into the base of the plunger 39 and advanced by subsequent slugs out through the passage 42. The blank is thus pierced while firmly backed by the abutment 37 and effectually supported laterally by virtue of the large area of engagement between the interfitting serrations on the nut blank and die 19.

As the head is retracted, the plunger 39 is advanced by the arm 47 and the action of the spring 44, the nut blank being carried backwardly out of the trimming die 19. In the final backward movement, the rear end of the sleeve 49 encounters the pins 51 and is held against further movement thereby causing the finished blank to be stripped off from the end of the tool 20 from which it may fall into a collecting receptacle or conveyor for advancing the blank to a threading mechanism (not shown).

I claim as my invention:

1. Apparatus for forming longitudinal peripheral serrations and punching out the center of a forged nut blank having an axially facing depression therein comprising, in combination, a die having an internally serrated recess, a tubular abutment disposed within and movable axially of said recess, a piercing tool movable into and out of said recess and adapted to enter said depression, means for advancing said tool with a nut blank supported opposite said recess to force the blank into the recess with the tool entering said depression and the blank backed by said abutment, and means operable after serration of the blank to arrest the retraction of said abutment whereby to cause said tool to punch out the center of the blank and deposit the slug within the abutment.

2. Apparatus for forming longitudinal peripheral serrations and punching out the center of a forged nut blank comprising, in combination, a die having internal teeth at one end, a yieldable abutment within said die movable away from and toward the die face, a piercing tool movable relative to said die to press a nut blank against said abutment and then force the same through said teeth, means to arrest the retraction of said abutment after said blank has been serrated by said teeth whereby further movement of the tool will punch out the center of the blank, means for advancing said piercing tool, and forging dies operable in the advance of said last mentioned means to forge a piece of wire in a shape for operation thereon by said die and tool.

3. Apparatus for forming longitudinal peripheral serrations and punching out the center of a forged nut blank comprising, in combination, a die having internal teeth at one end, a yieldable abutment within said die movable away from and toward the die face, a piercing tool movable relative to said die to press a nut blank against said abutment and then force the same through said teeth, means to arrest the retraction of said abutment after serration of the blank and with said teeth in engagement with the serrations on the blank, and means to advance said tool into said recess a distance to punch out the center of the blank following stopping of said abutment.

4. Apparatus for forming longitudinal peripheral serrations and punching out the center of a nut blank comprising, in combination, a die having internal teeth, a piercing tool movable axially into and out of the recess of said die to force a nut blank into the latter, and means controlling the movement of said blank to cause the tool to first force the blank through said teeth and then punch out the center of the blank.

5. Apparatus for forming longitudinal peripheral serrations and punching out the center of a nut blank comprising, in combination, a die having internal teeth, a piercing tool movable axially into and out of the recess of said die to force a nut blank into the latter, means controlling the movement of said blank to cause the tool to first force the blank through said teeth and then punch out the center of the blank, and means operating on retraction of said tool to strip the perforated blank off from said tool.

6. Apparatus for forming longitudinal peripheral serrations and punching out the center of a nut blank comprising, in combination, a die having internal teeth, a piercing tool movable axially into and out of the recess of said die to force a nut blank into the latter, and means controlling the movement of said blank to cause the tool to first force the blank through said teeth and then punch out the center of the blank while the serrations formed on said blank are in engagement with said die teeth.

7. Apparatus for forming longitudinal peripheral serrations and punching out the center of a nut blank comprising, in combination, a die having internal teeth, a piercing tool movable axially into and out of the recess of said die to force a nut blank into the latter, an abutment disposed within said die and retractible relative thereto in an axial direction, and means controlling the relative axial movements between said tool, said die, and said abutment to cause the nut blank to be serrated by the die and pierced by said tool in said movements.

8. Apparatus for forming longitudinal peripheral serrations and punching out the center of a nut blank comprising, in combination, a die having internal teeth, a piercing tool movable axially into and out of the recess of said die to force a nut blank into the latter, an abutment disposed within said die and retractible relative thereto in an axial direction, and means controlling the relative axial movements between said tool, said die, and said abutment to cause the nut blank to be serrated by the die and pierced by said tool in said movements, said abutment having a longitudinal passage adapted to receive the slug punched out of the blank by said tool.

9. The process of forming nuts having longitudinally extending peripheral serrations which comprises forging a length of wire to form the desired external shape and oppositely facing axial depressions, forcing the blank thus formed axially through a serrating die and punching out the center of the blank while the latter is in engagement with said serrating die.

10. The process of forming nuts having longitudinally extending peripheral serrations which comprises forging a length of wire to form the desired external shape and serrating the periphery and punching out the center of the blank thus formed in a single operation.

11. The process of forming nuts having longitudinally extending peripheral serrations which comprises forging a length of wire to form the desired external shape and successively serrating the periphery and punching out the center of the blank thus formed during relative movement between the blank and cutting tools along a single axial path.

12. The process of forming nuts having longitudinally extending peripheral serrations which comprises advancing pieces of wire successively through a plurality of positions while retaining positive control over the movements thereof, forging the piece in one of said positions into the desired external shape with an axially facing depression therein, serrating the exterior of the piece in a succeeding one of said positions, and punching out the center of the serrated piece while the latter is in said second mentioned position.

DAVID E. JOHNSON.